April 12, 1966 G. J. KIRCHNER 3,245,293
APPARATUS FOR MAKING FELT PADS
Filed Feb. 27, 1964 5 Sheets-Sheet 1

INVENTOR
GEORGE J. KIRCHNER
By Martin J. Carroll
Attorney

April 12, 1966 G. J. KIRCHNER 3,245,293
APPARATUS FOR MAKING FELT PADS
Filed Feb. 27, 1964 5 Sheets-Sheet 4

INVENTOR
GEORGE J. KIRCHNER
By Martin J. Carroll
Attorney

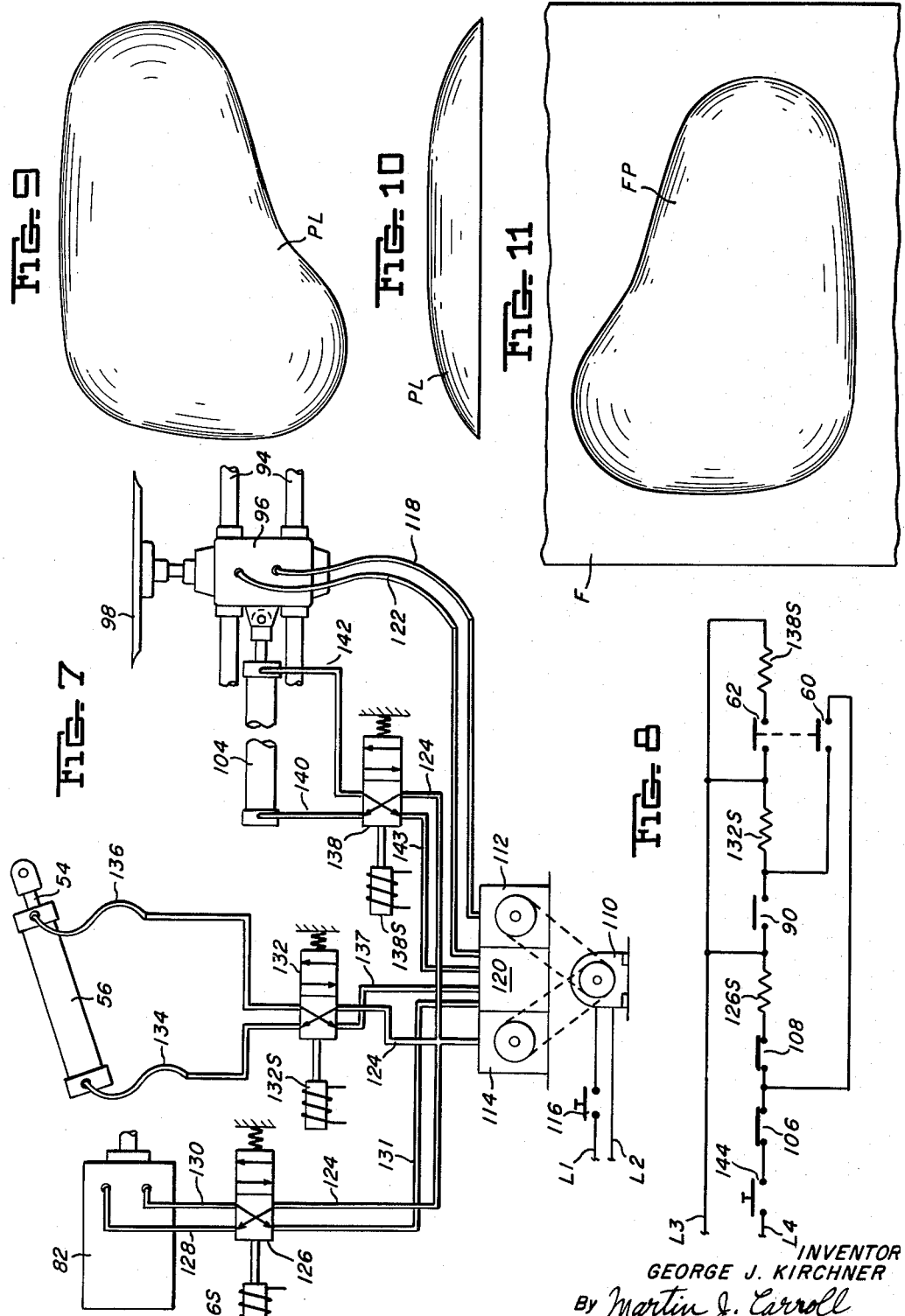

United States Patent Office 3,245,293
Patented Apr. 12, 1966

3,245,293
APPARATUS FOR MAKING FELT PADS
George J. Kirchner, Whitehall, Pa., assignor to Hapad, Incorporated, a corporation of Illinois
Filed Feb. 27, 1964, Ser. No. 347,854
9 Claims. (Cl. 83—1)

This invention relates to apparatus for making felt pads and more particularly for cutting the pads from a continuous length of felt. Apparatus for this particular purpose is shown in Anderson Patent No. 1,177,293 dated March 28, 1916. However, the apparatus of the Anderson patent has numerous disadvantages. Because of the arrangement of the dies, the pads cut from the felt tend to interfere with the operation of the machine and the operator must be prepared to manually remove the pads from the length of felt or from the operating mechanism of the machine. Also, the arrangement of the felt feeding mechanism and the cutter is such that only one male and one female die can be used with the machine. This, of course, increases the cost of manufacture of the pads. Also, the operating mechanisms of the machine are such that they cannot be readily adjusted for smoother operation or for different sizes and shapes of pads.

It is therefore an object of my invention to provide a device for making pads from lengths of felt wherein the finished pads are automatically removed from the length of felt and from the operating mechanism.

Another object is to provide such a device in which more than one length of felt may be processed at the same time.

Still another object is to provide such a device in which the operating mechanisms can be readily adjusted for different sizes and shapes of pads.

These and other objects will be more apparent after referring to the following specification and attached drawings in which:

FIGURE 7 is a schematic view of the hydraulic system used in my machine;

FIGURE 8 is a schematic wiring diagram of the electrical control used in the machine;

FIGURE 9 is a plan view of a felt pad manufactured by the machine;

FIGURE 10 is a side view of the pad of FIGURE 9; and

FIGURE 11 is a plan view of a strip of felt showing its configuration after a pad has been cut therefrom.

Figure 1:
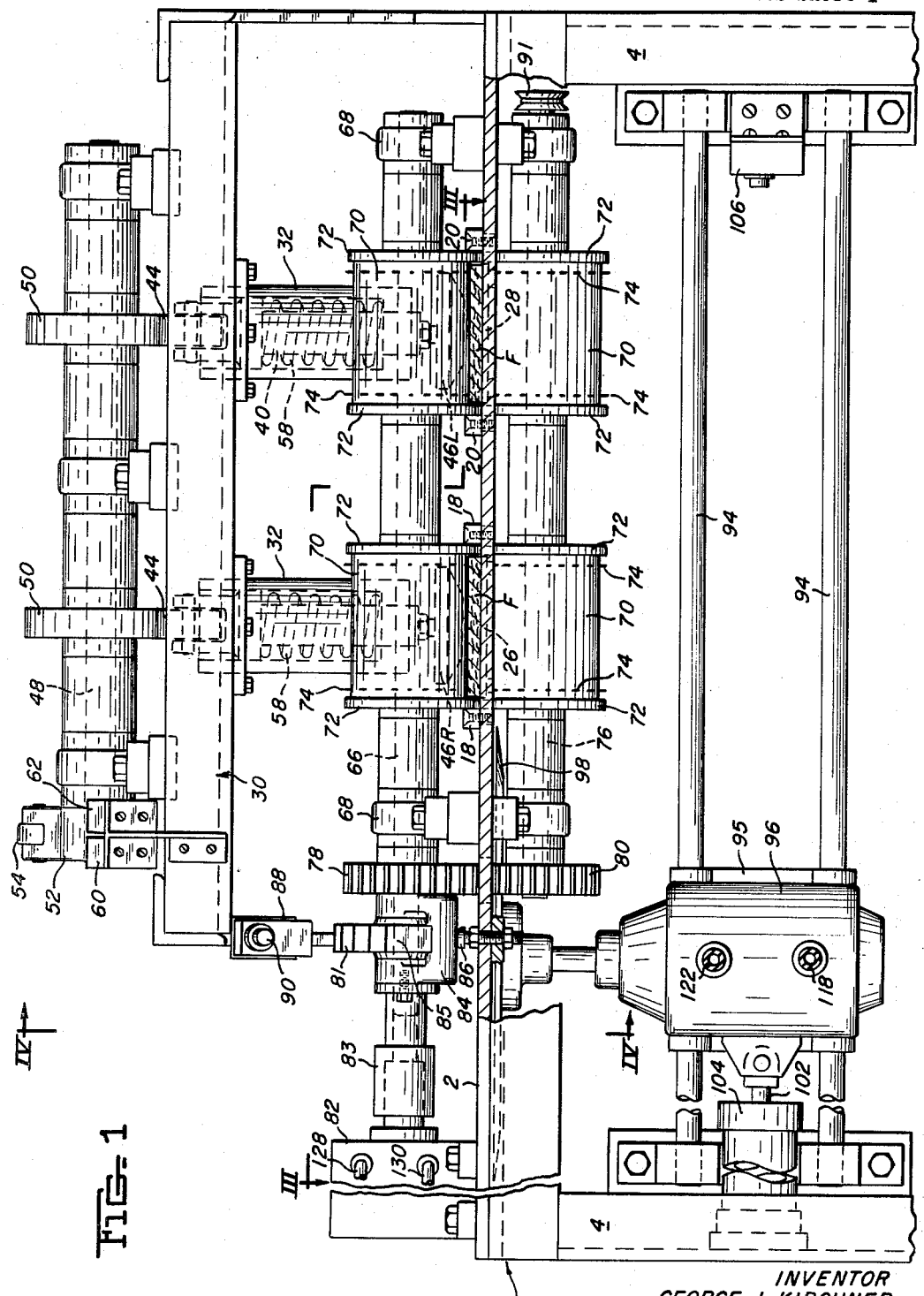
FIGURE 1 is an elevation of the machine of my invention from the delivery end.
Figure 2:
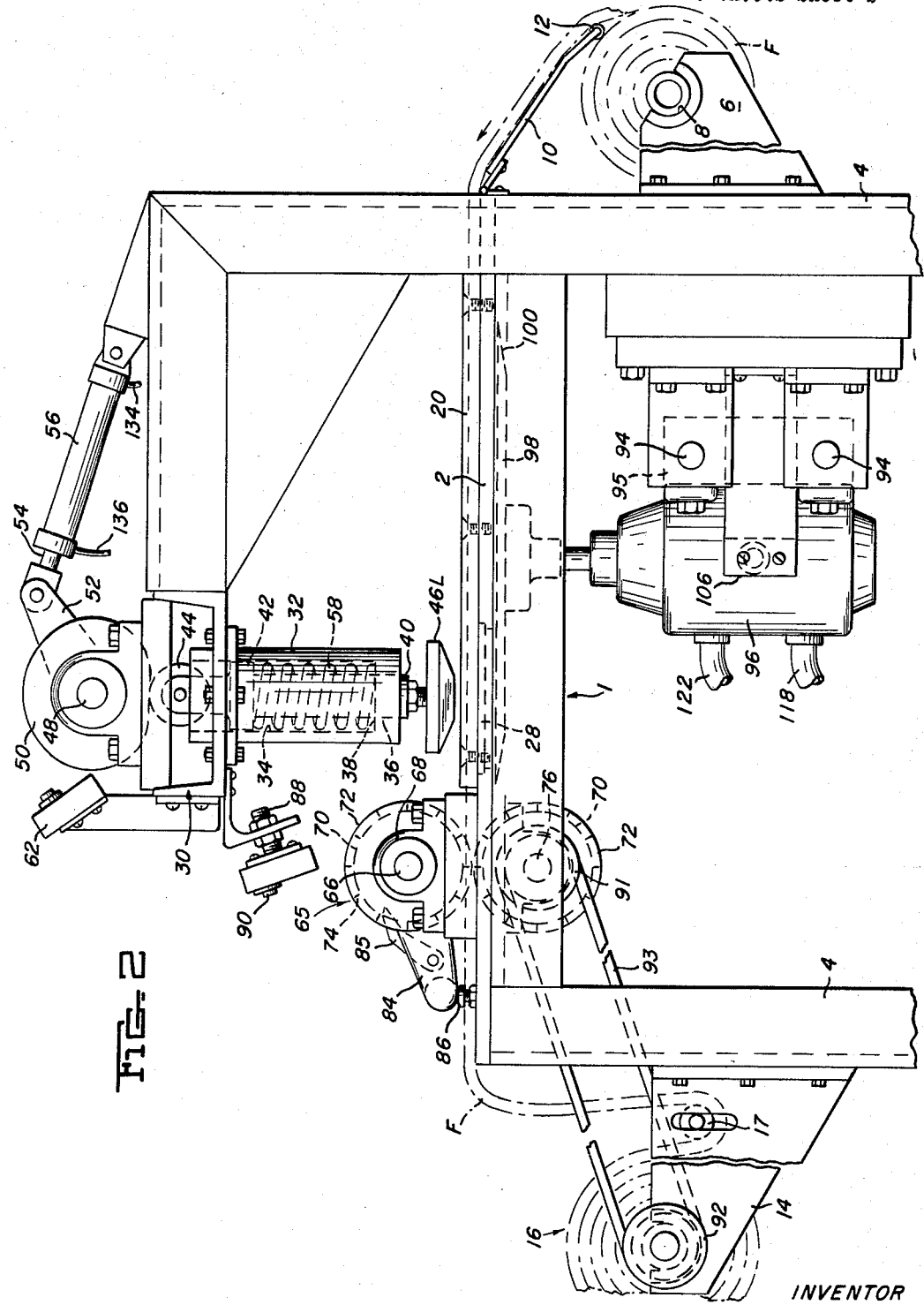
FIGURE 2 is a side elevation of the machine of FIGURE 1.
Figure 3:
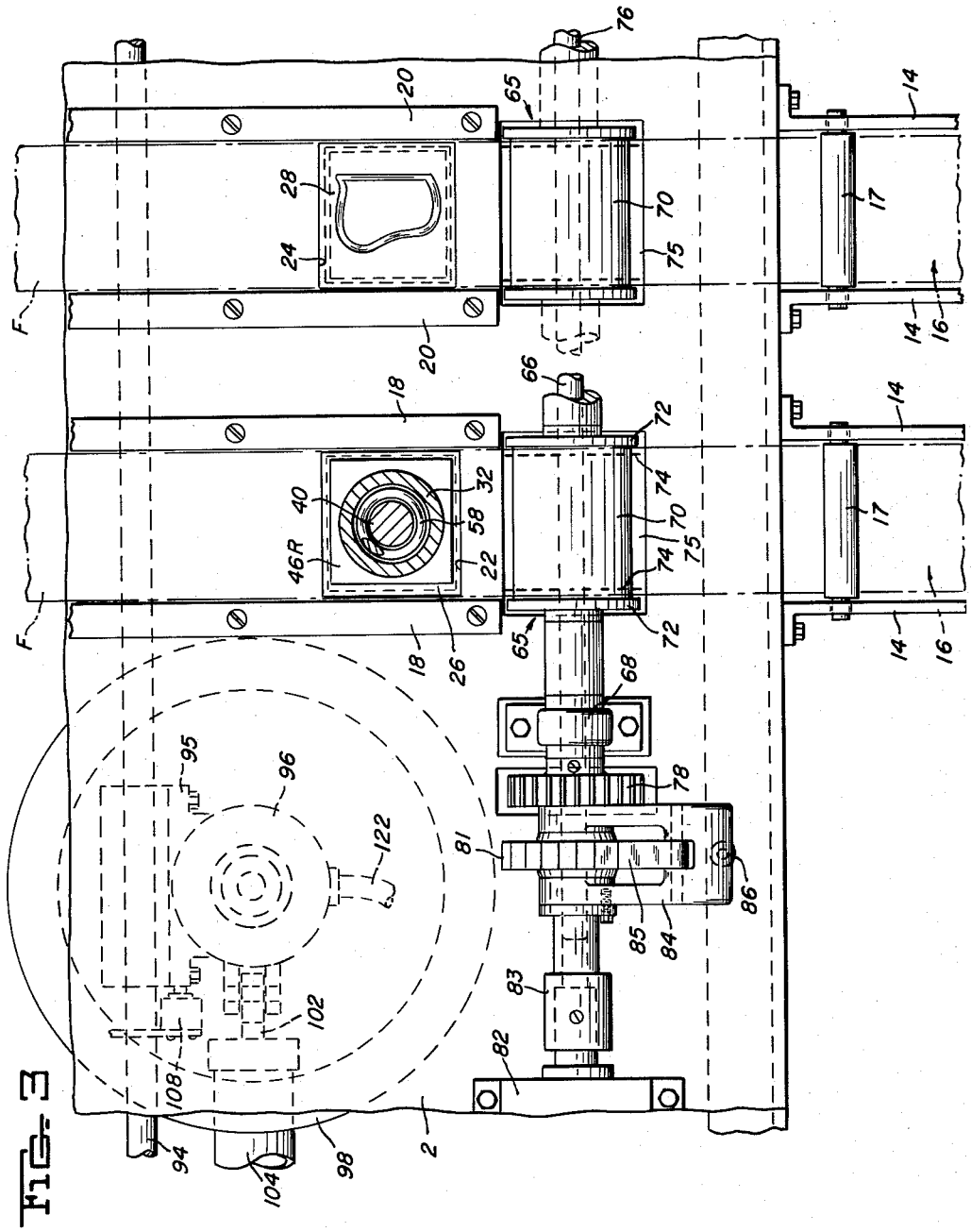
FIGURE 3 is a view taken on the line III—III of FIGURE 1.
Figure 4:
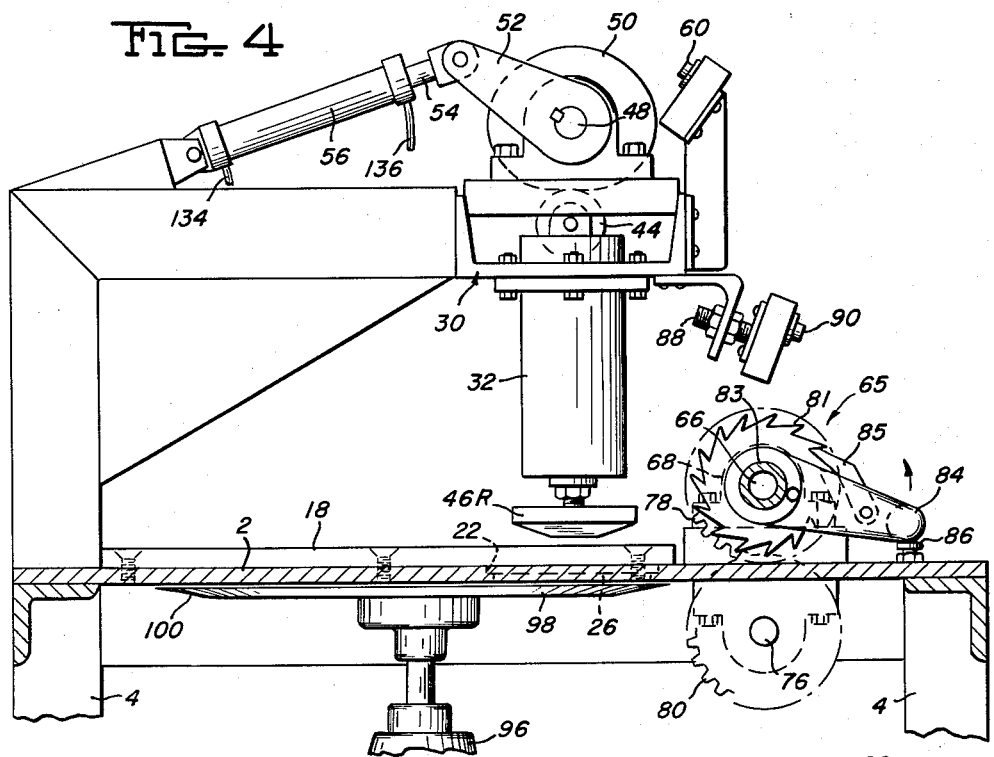
FIGURE 4 is a view taken on the line IV—IV of FIGURE 1.
Figure 5:
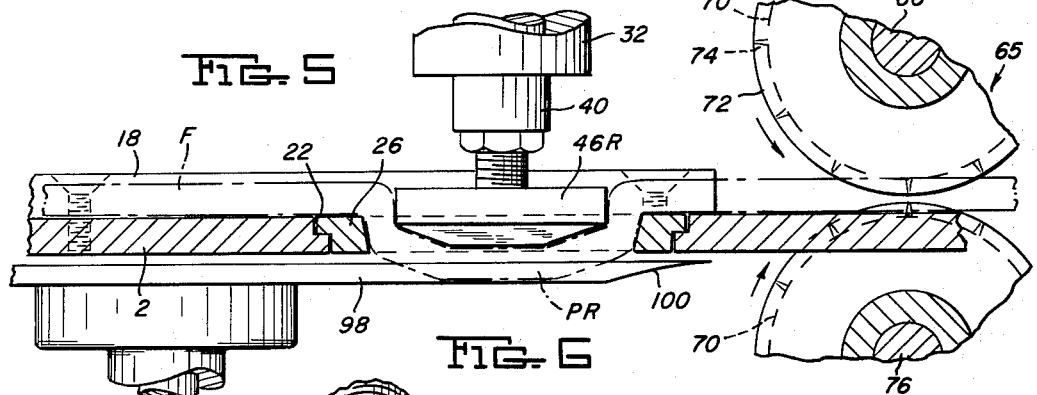
FIGURE 5 is an enlarged view, partly in section, of a detail of the machine.
Figure 6:
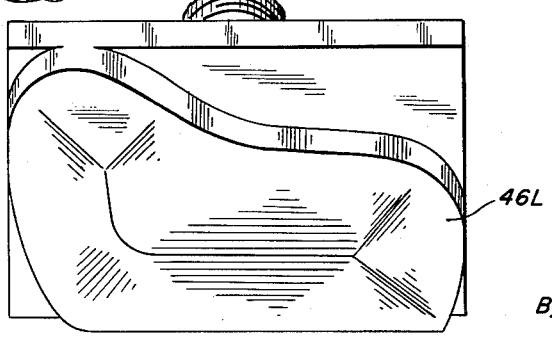
FIGURE 6 is a perspective view of a male die used in the machine of FIGURE 1.

Referring more particularly to the drawings, reference numeral 1 indicates a table having a top 2 supported by legs 4. Two pairs of brackets 6 are mounted on the table 1 at one end thereof with each bracket having a slot 8 therein. A roll of felt F is rotatably mounted on each pair of brackets. An arm 10 having a roller 12 mounted on the end thereof is pivotally mounted on the table 1 between each pair of brackets 6 for a purpose which will appear later. Two pairs of brackets 14 are mounted on the table 1 on the end opposite brackets 6 and in alignment therewith. The arrangement of the brackets 14 is substantially the same as that of brackets 6. A take-up reel 16 is mounted on each pair of brackets. A guide roll 17 is mounted on each pair of brackets 14 on the entry side of reel 16. Two pairs of side guides 18 and 20 are mounted on the table top 2 in alignment with the rolls of felt F and the take-up reels 16. Openings 22 and 24 are provided in table top 2 for receiving female dies 26 and 28, respectively. It will be seen that the openings in the dies 26 and 28 are shaped to conform to the outline of pads PR and PL, respectively, but are larger than the openings. The pad PR, except for being opposite hand, is the same as pad PL shown in detail in FIGURES 9 and 10. The sides of the die openings slope downwardly and inwardly as best shown in FIGURES 3 and 5. A bracket 30 is mounted above the table top 2 and a pair of cylinders 32 are mounted thereon with their axes vertical and in alignment with the dies 26 and 28. As best shown in FIGURE 2, each cylinder 32 has an opening 34 terminating in a reduced diameter lower portion 36 providing a shoulder or abutment 38. A rod 40, having a collar 42 mounted thereon which provides an abutment, is slidably mounted in opening 34. A cam roller 44 is secured to the upper end of rod 40. A male die is mounted on the lower end of each rod 40 below the cylinder 32. One male die 46R is aligned with die 26 and the other male die 46L is aligned with die 28. The bottoms of dies 46R and 46L are shaped to conform to the shape of pads PR and PL, respectively. A cam shaft 48 is mounted above rollers 44 with cams 50 being mounted thereon, one in alignment with each roller 44. One end of an arm 52 is secured to the shaft 48 and its other end is pivotally connected to a piston rod 54 which is mounted for movement in a pivotally mounted hydraulic cylinder 56. A spring 58 surrounds the rod 40 between shoulder 38 and collar 42 so as to urge rod 40 upwardly. Limit switches 60 and 62 are mounted on the side of shaft 48 opposite cylinder 56 in the path of travel of arm 52 for actuation thereby. A container (not shown) may be mounted beneath dies 26 and 28 to receive the pads PR and PL.

Felt advancing mechanism 65 is mounted on the exit side of dies 26 and 28. This includes a rotatable shaft 66 mounted above table top 2 in bearing 68. A pair of rollers 70 are mounted on shaft 66, one in alignment with each take-up reel 16. Each roller 70 has peripheral end flanges 72 and a plurality of pins 74 spaced around its periphery adjacent each flange 72. An opening 75 is provided in table top 2 beneath each roller 70. A rotatable shaft 76 is mounted beneath the table top 2 and also carries two rollers 70 which extend into openings 75 directly beneath the upper rollers 70. A gear 78 on shaft 66 meshes with a gear 80 on shaft 76 to cause the shafts 66 and 76 to rotate in unison. The shaft 66 also has a ratchet 81 mounted thereon for rotation therewith. The shaft 66 is rotated by means of a rotary hydraulic motor 82 of any standard type such as a ROTAC torque actuator manufactured by Ex-Cell-O Corporation of Greenville, Ohio. As best shown in FIGURES 2 and 3 motor 82 has a hollow coupling 83 attached thereto for rotation therewith. The end of shaft 66 is rotatably received in the opening of coupling 83. An arm 84 is secured to coupling 83 for movement therewith and a pawl 85 is pivotally mounted thereon. When the motor 82 rotates the arm 84 upwardly, the pawl 85 will engage the teeth of ratchet 81 and cause movement of shaft 66 to feed the felt F. The extent of movement of the arm 84 may be varied by means of a lower adjustable stop 86 and an upper adjustable stop 88 in order to vary the amount of feed of the felt F. A switch 90 is mounted on the stop 88 and is adapted to be actuated by the arm 84. A pulley 91 is secured to the end of the shaft 76 remote from gear 90 in alignment with a pulley 92 attached to the shaft of the take-up reels 16. A belt 93 extends around pulleys 91 and 92.

Two parallel horizontal guide rods 94 mounted beneath table top 2 extend parallel to the axes of feed rolls 70 and support a carriage 95 which carries a standard rotary hydraulic motor 96. The shaft of motor 96 extends upwardly and carries a cutting blade 98. The blade 98 has a horizontal upper surface and a parallel lower surface except for a tapered end portion 100 which is hollow ground. A piston rod 102 which is slidable in hydraulic cylinder 104 is shown connected to motor 96 but which may be connected to carriage 95. Limit switches 106 and 108 are mounted on table 1 so as to be actuated by carriage 95 or motor 96 at each limit of their travel.

As shown in FIGURE 7, a motor 110 drives hydraulic pumps 112 and 114 which deliver fluid under pressure to the various hydraulic motors. The motor 110 and pumps 112 and 114 are preferably mounted on table 1 below the top 2. The motor 110 is provided with power from line L1, L2 through a switch 116. The pump 112 delivers fluid under pressure to motor 96 through a flexible conduit 118. Fluid from the motor 96 is returned to reservoir 120 through a flexible conduit 122. Fluid is delivered to motor 82 from pump 114 through conduit 124 and solenoid operated valve 126. When solenoid 126S is energized fluid under pressure will be connected to the feed side of motor 82 through conduit 128 and will return to sump 120 through conduits 130 and 131. When solenoid 126S is deenergized the valve 126 will cause conduit 130 to be connected to conduit 124 and conduit 128 to be connected to conduit 131.

Fluid is delivered to cylinder 56 from conduit 124 through solenoid valve 132. When solenoid 132S is energized fluid under pressure will pass through flexible conduit 134 to the rear end of cylinder 56 and return to sump 120 through flexible conduits 136 and 137. When solenoid 132S is deenergized the valve 132 will cause conduit 136 to be connected to conduit 124 and thus piston rod 54 will be retracted.

Fluid is delivered to cylinder 104 from conduit 124 through solenoid valve 138. When solenoid 138S is energized fluid under pressure will pass through conduit 140 to the rear end of cylinder 104 and return to sump 120 through conduits 142 and 143. When solenoid 138S is deenergized the valve 138 will cause conduit 142 to be connected to conduit 124 so as to retract carriage 95 and motor 96.

The control circuit shown in FIGURE 8 includes power source L3, L4 and a control switch 144 connected in series with micro-switches 106 and 108, solenoid 126S, micro-switch 90, solenoid 132S, micro-switch 62 and solenoid 138S. Micro-switch 60 is connected in parallel with micro-switches 90 and 108 and solenoids 126S. Micro-switch 106 is normally closed; that is, it is closed when not depressed and open when depressed. The other micro-switches are normally open.

In operation, two rolls of felt F are placed in the slots 8 and the ends fed into the rollers 70. The switch 116 is then closed. This places the entire hydraulic system under pressure so that motor 96 will rotate the cutter blade 98 at a peripheral speed of preferably 3100 ft. per minute and at least 2900 ft. per minute. Switch 144 is then closed. Since switches 106 and 108 are closed, this will energize solenoid 126S and position valve 126 to cause motor 82 to rotate through 110°. This rotation of motor 82 will cause the rollers 70 to rotate with the pins 74 engaging the felt F and feeding it the desired distance. Arm 84 will also rotate upwardly and close micro-switch 90. This will energize solenoid 132S through switches 106, 108 and 90 so as to position valve 132 to deliver fluid into the rear end of cylinder 56 and rotate arm 52. Rotation of arm 52 rotates cams 50 to force the male dies 46R and 46L downwardly. Since the felt F is held by rollers 12 at the end of arms 10 and by rollers 70, the felt is stretched somewhat when forced downwardly into female dies 26 and 28 by the male dies 46R and 46L with a portion of the felt below the bottom of the female dies and a portion above the bottom thereof as shown in FIGURE 5. Arm 52 will close micro-switches 60 and 62 at the end of its travel. Closing of switches 60 and 62 energizes solenoid 138S through switches 106, 60 and 62 and solenoid 132S so as to position valve 138 to deliver fluid into the rear end of cylinder 104 and start the cutter blade 98 on its cutting stroke. When the carriage 95 leaves the switch 108 it will open, thus deenergizing solenoid 126S and repositioning valve 126 to cause the motor 82 to rotate in the reverse direction. However, the pawl 85 will not engage the teeth of ratchet 81 so that the rollers 70 will not move. The cutter blade 98 will successively cut pads PR and PL from the felt F and the pads will fall into the containers. The cut portion of the pad will be the contoured portion in the severed pad. As shown in FIGURE 11 a depression FP is left in the felt F after cutting a pad PL therefrom. It will be seen that the dies are arranged so that the cutter blade 98 will cut the thinnest section first, this being necessary for best results.

At the completion of the feeding stroke the carriage 95 will contact switch 106 and open it. This will deenergize solenoids 132S and 138S. Deenergization of solenoid 132S will cause male dies 46R and 46L to return to their upper position. Deenergization of solenoid 138S will cause reversal of travel of carriage 95. Thus all parts of the circuit are in their original position and the cycle will be repeated when the carriage 95 closes switch 108. After sufficient felt has been processed the forward end thereof is attached to the take-up reels 16 so that it will be wound thereon. Movement of roll 17 and slippage of the belt 93 will prevent too much tension on the felt as it builds up on reel 16. If desired, additional dies may be provided for cutting more than two pads at the same time.

While one embodiment of my invention has been shown and described it will be apparent that other adaptations and modifications may be made without departing from the scope of the following claims.

I claim:
1. Apparatus for cutting articles having one flat side from a length of felt comprising a table having a flat top, a pair of side guides for said length of felt on said table top extending longitudinally thereof, a female die arranged between said side guides, said female die having an opening therein with a peripheral contour similar to but larger than the contour of the article to be cut, said opening having side walls extending downwardly and inwardly, a vertically movable male die mounted above said female die, said male die having a peripheral contour similar to that of the article to be cut and a bottom portion contoured to provide the desired configuration in the article, means for feeding said felt step by step a predetermined distance, a cutting blade mounted below the table top in alignment with said female die, said cutting blade having a flat upper surface, means for rotating said blade at a high speed, means for moving said blade transversely from an initial position at one side of said female die to a second position where at least the outer periphery of said blade is on the other side of said female die, means automatically operable by said felt feeding means at completion of the felt feed to feed said male die downwardly into said female die to force the felt into said die opening with a portion thereof extending below the top of said cutting blade, means automatically operable at completion of downward movement of said male die to initiate said cutting blade moving means to move said cutting blade from its initial position to its second position, means operable by completion of the cutting blade feeding stroke to return the cutting blade to its initial position and to raise the male die, and means operable by return of the cutting blade to its initial position to actuate said felt feeding means to feed additional felt.

2. Apparatus for cutting articles according to claim 1 in which the felt feeding means includes a pair of shafts on the exit side of said dies arranged transversely of the guides one above the table top and the other below the table top, a roller mounted on each shaft in alignment with said guides, and pins on said rollers for engaging said felt, said table top having an opening therein between the guides to permit engagement of the felt by said rollers.

3. Apparatus for cutting articles according to claim 1 including a shaft for supporting said male die, a cylinder for receiving said die shaft, a cam roller mounted on the top of said die shaft, an abutment in said cylinder, an abutment on said die shaft, a spring surrounding said die shaft and bearing against said abutments to urge said die shaft upwardly, a rotatable cam above said roller, and means for rotating said cam to move said male die downwardly.

4. Apparatus for cutting articles having a flat bottom and a variable thickness across the width thereof from lengths of felt comprising a table having a flat top, two pairs of side guides arranged side by side on said table top for receiving lengths of felt to be cut, a female die arranged between the side guides of each pair, each female die having an opening therein with a peripheral contour similar to but larger than the contour of the article to be cut, each of said openings having side walls extending downwardly and inwardly, a vertically movable male die mounted above each female die, each male die having a peripheral contour similar to that of the article to be cut and a bottom portion contoured to provide the desired configuration in the article, means for feeding said lengths of felt step by step a predetermined distance, a cutting blade mounted below the table top in alignment with said female dies, said cutting blade having a flat upper surface and a hollow ground lower tapered end portion, means for rotating said blade at a high speed, means for moving said blade transversely from an initial position at one side of one of said female dies to a second position where at least the outer periphery of said blade is on the other side of the other of said female dies, means for feeding said male dies downwardly into said female dies to force the felt into said die openings with a portion thereof extending below the top of said cutting blade, means automatically operable at completion of downward movement of said male dies to initiate said cutting blade moving means to move said cutting blade from its initial position to its second position, means operable by completion of the cutting blade feeding stroke to return the cutting blade to its initial position and to raise the male dies, and means operable by return of the cutting blade to its initial position to actuate said felt feeding means to feed additional felt.

5. Apparatus for cutting articles according to claim 4 including a vertical shaft for supporting each of said male dies, a cylinder for receiving said die shaft, a cam roller mounted on the top of said die shaft, an abutment in said cylinder, an abutment on said die shaft, a spring surrounding said die shaft and bearing against said abutments to urge said die shaft upwardly, a rotatable cam above and in contact with each of said rollers, and means for rotating said cams to move said male dies downwardly.

6. Apparatus for cutting articles according to claim 4 in which the felt feeding means includes a pair of shafts on the exit side of said dies arranged transversely of the pairs of guides one above the table top and the other below the table top, a pair of rollers mounted on each of said shafts in alignment with said pairs of guides, and pins on said rollers for engaging said felt, said table top having an opening therein between the guides of each pair to permit engagement of the felt by said rollers.

7. Apparatus for cutting articles according to claim 6 including a vertical shaft for supporting each of said male dies, a cylinder for receiving said die shaft, a cam roller mounted on the top of said die shaft, an abutment in said cylinder, an abutment on said die shaft, a spring surrounding said die shaft and bearing against said abutments to urge said die shaft upwardly, a rotatable cam above and in contact with each of said rollers, and means for rotating said cams to move said male dies downwardly.

8. Apparatus for cutting articles having a flat bottom and a variable thickness across the width thereof from lengths of felt comprising a table having a flat top, two pairs of side guides arranged side by side on said table top, means at one end of each pair of guides for supporting a roll of felt to be cut, means at the second end of each pair of guides for supporting a roll of felt from which articles have been cut, a female die arranged between the side guides of each pair, each female die having an opening therein with a peripheral contour similar to but larger than the contour of the article to be cut, each of said openings having side walls extending downwardly and inwardly below said table top, a vertically movable male die mounted above each female die, each male die having a peripheral contour similar to that of the article to be cut and a bottom portion contoured to provide the desired configuration in the article, a pair of shafts on the exit side of said dies arranged transversely of the pairs of guides one above the table top and the other below the table top, a pair of rollers mounted on each of said shafts in alignment with said pairs of guides, pins on said rollers for engaging said felt, said table top having an opening therein between the guides of each pair to permit engagement of the felt by said rollers, a cutting blade mounted below the table top in alignment with said female dies, said cutting blade having a flat upper surface and a hollow ground lower tapered end portion, means for rotating said blade at a high speed, means for moving said blade transversely from an initial position at one side of one of said female dies to a second position where at least the outer periphrey of said blade is on the other side of the other of said female dies, means for rotating said rollers a predetermined amount to feed the lengths of felt simultaneously, means automatically operable by said last named means at completion of the felt feed to feed said male dies downwardly into said female dies to force the felt into said die openings with a portion thereof extending below the top of said cutting blade, means automatically operable at completion of downward movement of said male dies to initiate said cutting blade moving means to move said cutting blade from is initial position to its second position, means operable by completion of the cutting blade feeding stroke to return the cutting blade o its initial position and to raise the male dies, and means operable by return of the cutting blade to its initial position to actuate said roller rotating means to feed additional felt.

9. Apparatus for cutting articles according to claim 8 including a shaft for supporting each of said male dies, a cylinder for receiving said die shaft, a cam roller mounted on the top of said die shaft, an abutment in said cylinder, an abutment on said die shaft, a spring surrounding said die shaft and bearing against said abutments to urge said die shaft upwardly, a rotatable cam above and in contact with each of said rollers, and means for rotating said cams to move said male dies downwardly.

References Cited by the Examiner

UNITED STATES PATENTS

| | | | |
|---|---|---|---|
| 1,177,293 | 3/1916 | Anderson | 83—1 |
| 1,204,922 | 11/1916 | Wilms | 83—176 X |
| 1,782,362 | 11/1930 | McArthur | 83—222 X |
| 2,048,361 | 7/1936 | Stevens | 83—1 |
| 2,154,256 | 4/1939 | Zimmerman | 83—423 |
| 2,164,806 | 7/1939 | Eickman | 83—156 X |

FOREIGN PATENTS 901,724    7/1962    Great Britain.

WILLIAM W. DYER, Jr., *Primary Examiner.*

J. M. MEISTER, *Assistant Examiner.*